Dec. 9, 1952     W. A. BEDFORD, JR     2,620,532
FASTENER CLIP

Filed Jan. 11, 1946     2 SHEETS—SHEET 1

Inventor
WILLIAM A. BEDFORD JR.,
By John Todd
Attorney

Dec. 9, 1952       W. A. BEDFORD, JR       2,620,532
FASTENER CLIP
Filed Jan. 11, 1946                       2 SHEETS—SHEET 2
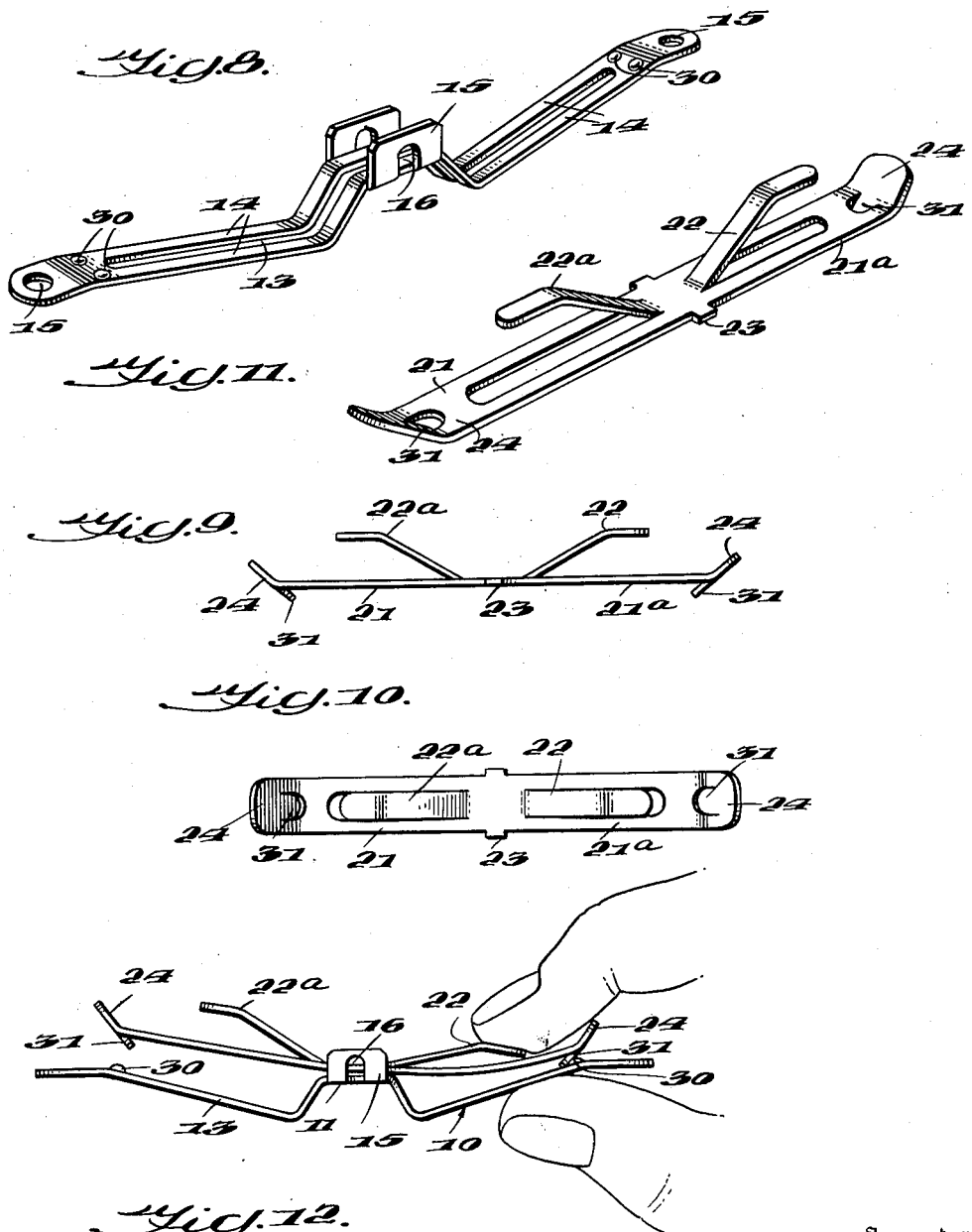
Inventor
WILLIAM A. BEDFORD, JR.,
By John Todd
Attorney Patented Dec. 9, 1952

2,620,532

UNITED STATES PATENT OFFICE 2,620,532

FASTENER CLIP

William A. Bedford, Jr., Hingham, Mass., assignor to United-Carr Fastener Corporation, Cambridge, Mass., a corporation of Massachusetts Application January 11, 1946, Serial No. 640,424

6 Claims. (Cl. 24—81)

The present invention relates to fasteners such as clip fasteners of the type designed to fasten an article to a support, and aims generally to improve existing fasteners of that type.

One of the objects of the present invention is the provision of an improved, simple and inexpensive fastener clip for attaching articles to clothing and like supports.

A further object of the invention is the provision of an improved fastener for attaching bow ties and like articles of clothing to shirt collars and like flexible supports, and which fastener will securely hold the article in place during use.

A further object of the invention is the provision of a two-part fastener clip having a part-carrying member and a relatively movable member each having cooperating support-engaging surfaces, one of the members having a bearing surface spaced from the support-engaging surface and the other member having a fulcrumed bearing on the bearing surface and an operating portion disposed at an obtuse angle thereto.

The above and other aims and objects of the invention will be apparent to persons skilled in the art from a consideration of the accompanying drawings and annexed specification illustrating and describing a preferred embodiment of the invention.

In the drawings—

Fig. 8 is a detail perspective view of the part-carrying member shown in Figs. 5, 6 and 7;

Fig. 9 is a side view of the movable fastener member;

Fig. 10 is a plan view thereof;

Fig. 11 is a perspective view of the movable fastener member; and

Fig. 12 is an elevation illustrating the manner of operating the fastener member to separate the cooperating clamping parts of the fastener.

Figure 1:
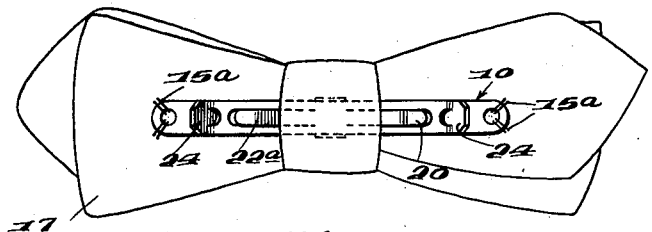
Fig. 1 is a plan view of one embodiment of my improved fastener adapted for attaching bow ties to the wing folds of a shirt collar, the fastener being shown as attached to the inner folds of the tie.

The form of fastener illustrated in the drawings is of the double ended type suitable for attaching a bow tie or the like to the opposite wing folds of a shirt collar, though it will be understood that the essential features of the invention may be embodied in forms of fasteners other than the double ended type for other uses.

Preferably, the fastener clip is of two-part construction comprising a relatively fixed part which may be secured to the part to be supported and therefore termed a part-carrying member 10 provided with a bearing support 11 and at least one spaced support-engaging or clamping surface 12.

In the illustrated embodiment of the invention the part 10 is double ended having two clamping or support-engaging portions 12 near opposite ends of an elongated strip of material. The part 10 is preferably slotted for the major portion of its length, as at 13, to provide laterally yieldable sides 14 connected together at their ends by the support-engaging portions 12. The terminal ends of the member 10 may be apertured as at 15 or otherwise formed to receive suitable fastenings such as eyelets or stitching 15a for securing the member 10 to the article to be supported in the illustrated embodiment as bow tie 17.

Figure 2:
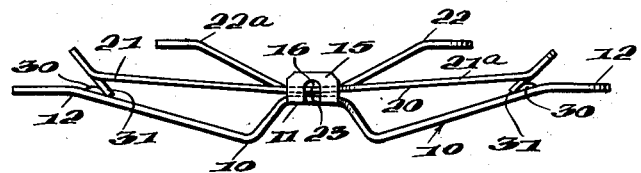
Fig. 2 is a side elevation of the fastener shown in Fig. 1.
Figure 3:
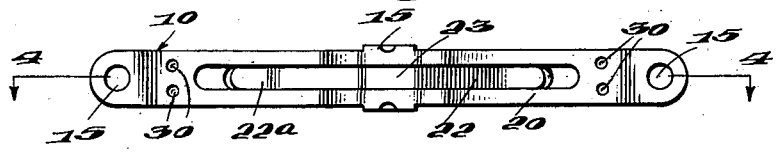
Fig. 3 is a bottom plan view thereof.
Figure 4:
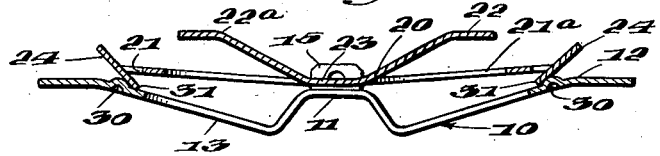
Fig. 4 is a longitudinal sectional view of the fastener as taken on the line 4—4 of Fig. 3.
Figure 5:
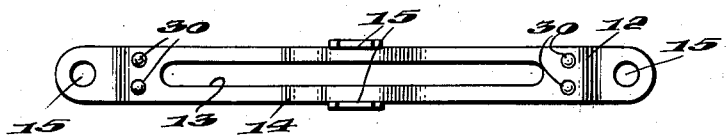
Fig. 5 is a plan view of the part-carrying member of the fastener.
Figure 6:
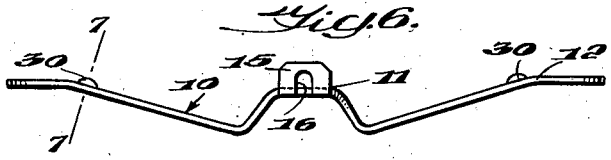
Fig. 6 is a side elevation thereof.

The member 10 is preferably shaped so that the bearing support 11 and clamping surfaces 12 are disposed in planes spaced from each other and from other intermediate portions of the member, and in the form shown the base is generally of elongated W-shape, as shown in Figs. 2, 4 and 6. This permits movement of the movable fastener lever member 20 toward the member 10 in regions adjacent the bearing support 11.

The bridge or bearing portion 11 is provided with retaining bearings 16 disposed normal to the rails 14 and preferably formed integrally therewith, which bearings are apertured as at 16 to receive the pivots of the movable fastener member to be described.

The movable fastener member 20 of the clip is preferably in the form of a lever having one or more fastener arms 21 and 21a and angularly disposed handle portions 22 and 22a and an intermediate fulcrum pivot 23. The movable member 20 is preferably formed of resilient material and the handle portions 22 and 22a may be cut from the body of the member 20 and bent outwardly from the region of the pivot as shown. Preferably the member 20 is double ended in that the fastener arms 21—21ª and handle portions 22—22ª are provided on opposite sides of the pivot 23, which suitably is in the form of integral trunnions extending laterally from the intermediate central portion of the pivot.

The end portions of the movable member 20 provide support-engaging surfaces 24 for cooperation with the support-engaging surfaces 12 of the member 10 and desirably the terminal ends of the member 10 are outturned as shown, to facilitate entrance of a support, for example a collar wing, between the members 10 and 20.

Figure 7:
Fig. 7 is a transverse sectional view taken on the line 7—7 of Fig. 6.

Preferably the support-engaging surfaces 12 and 24 are each provided with support-gripping means of suitable construction to engage and grip the support and hold the clip securely thereto. One suitable form of support-gripping means for engaging a flexible support, such as a collar wing, is illustrated in the drawings and comprises spaced projections or dimples 30 on one of the surfaces, for example the surface 12, and a coacting tongue 31 on the other surface, for example the surface 24. The projections 30 may be formed by dimpling the material outwardly, as shown in Fig. 7, and they are preferably spaced apart transversely of the member 10 to provide an intermediate space for the inwardly extending tongue 31.

The two component parts of the fastener clip are preferably made from separate pieces of material. Both may be of resilient material, though if desired, the member 10 may be made of more rigid material than the movable fastener member 20.

The members 10 and 20, formed as above described, may be readily assembled by first expanding the resilient side rails 14 of the member 10 and then inserting the pivot bearings 23 of member 20 in the apertured retainer bearings 15 of the member 10. The laterally resilient bearings 15 thus have snap fastener engagement with the pivot trunnions 23 of the movable fastener member 20. The position of the bearing surface 11 of the member 10 in a plane inwardly of the plane of the support-engaging surfaces 12 causes the support-engaging surfaces 24 of the member 20 to be tensioned normally against the support-engaging surfaces 12 of the member 10, and thus normally grip a support with the necessary tension to hold the fastener clip, and the article carried thereby, in desired position in use.

The coacting support-engaging surfaces 12 and 24 may be separated to be slipped over or disengaged from a support by applying relative compression force between the leg of the member 10 and a handle portion 22 or 22ª on the opposite side of the fulcrum bearing as shown in Fig. 12.

Advantages of the invention reside in the provision of a two-part fastener, each part being readily formed from a single piece of material and so constructed to permit of ready assembly. The novel construction of the movable fastener member having integral operating handle portions for applying pressure to the members provides a novel and efficient means for effecting separation of the coacting support-engaging and gripping means when applying the fastener to or removing it from a support.

Although I have illustrated and described a preferred embodiment of the invention I do not intend to be limited thereby as the scope of the invention is best defined in the appended claims.

I claim:

1. A fastener comprising an elongated W-shaped member having longitudinally spaced end portions and an intermediate bridge portion and a relatively movable fastener member provided intermediate its ends with an integral pivot means and provided adjacent said pivot means with integral operating members for each end extending outwardly at an obtuse angle thereto on opposite sides of said pivot means, said intermediate bridge portion of said W-shaped member providing a bearing surface parallel to and disposed in a plane inwardly of said end portions thereof, and said W-shaped member being longitudinally slotted to provide laterally resilient portions and having opposed apertured bearings extending from said bearing surface normal to the plane thereof and disposed on said resilient portions in snap fastener engagement with said pivot means.

2. A fastener clip comprising two cooperating superposed elements, each having support-engaging surfaces adjacent the opposite ends thereof, one of said elements being slotted longitudinally to provide laterally resilient portions, said resilient portions having intermediate portions providing a bearing surface spaced from the supporting-engaging surfaces of said one element, opposed apertured bearings extending from said intermediate portions substantially normal to said bearing surface, and the other of said elements having a fulcrum bearing upon said bearing surface and pivot means in snap fastener engagement in said bearings.

3. A fastener clip in accordance with claim 2 wherein the second named element has an operating member integral therewith for moving said element about its fulcrum and pivot means to separate the support-engaging surfaces at one end of said elements.

4. A fastener comprising an elongated supporting member having part-engaging portions at opposite ends and an intermediate bearing portion and an elongated resilient supported member having part-engaging portions at opposite ends opposing the part-engaging portions of said supporting member and an intermediate integral pivot means, said supporting member being longitudinally slotted to provide laterally resilient portions, said bearing portion comprising intermediate portions of said laterally resilient portions and having opposed apertured bearings disposed substantially normal thereto in snap fastener engagement with said pivot means of said supported member.

5. A fastener in accordance with claim 4 wherein the supported member has integral operating members for each end extending outwardly at an obtuse angle thereto on opposite sides of said pivot means.

6. A double ended fastener adapted for attachment to laterally spaced supports comprising an elongated member having support-engaging surfaces at opposite ends and an intermediate bearing portion, said elongated member being longitudinally slotted to provide laterally resilient portions and having opposed bearing members extending from said resilient portions at said bearing portion, and a movable fastener member having spaced end support-engaging surfaces opposing the support-engaging surfaces of said elongated member and an intermediate portion with pivots in snap fastener engagement with said bearing members, said movable fastener having operating members cut therefrom and integrally connected thereto adjacent the intermediate portion thereof and extending outwardly in opposite directions thereto at an obtuse angle.

WILLIAM A. BEDFORD, Jr.

REFERENCES CITED

The following references are of record in the file of this patent:

UNITED STATES PATENTS

| Number | Name | Date |
|---|---|---|
| 1,142,132 | Yonts | June 8, 1915 |
| 1,178,458 | Rea | Apr. 4, 1916 |
| 1,263,214 | De Steiger | Apr. 16, 1918 |
| 1,288,059 | Lederer | Dec. 17, 1918 |
| 1,370,883 | Crosby | Mar. 8, 1921 |
| 1,382,515 | Kelly | June 21, 1921 |
| 1,477,762 | Neggesmith | Dec. 18, 1923 |
| 1,509,444 | Pithouse | Sept. 23, 1924 |
| 1,839,739 | Cohn | Jan. 5, 1932 |
| 1,900,686 | Averill | Mar. 7, 1933 |
| 1,942,904 | Schoonmaker | Jan. 9, 1934 |
| 2,071,181 | Smith | Feb. 16, 1937 |
| 2,137,542 | Murphy | Nov. 22, 1938 |
| 2,273,072 | Stiele | Feb. 17, 1942 |
| 2,306,829 | Mutlow | Dec. 29, 1942 |
| 2,438,645 | Palagonia | Mar. 30, 1948 |

FOREIGN PATENTS

| Number | Country | Date |
|---|---|---|
| 121,088 | Switzerland | June 16, 1927 |
| 406,606 | France | Dec. 11, 1909 |
| 798,335 | France | Mar. 2, 1936 |